(12) United States Patent
Koch et al.

(10) Patent No.: US 10,091,933 B2
(45) Date of Patent: Oct. 9, 2018

(54) APPARATUS AND METHOD FOR YIELD SENSOR INSTALLATION

(71) Applicant: Precision Planting LLC, Tremont, IL (US)

(72) Inventors: Justin Koch, Deer Creek, IL (US); Michael Strnad, Delavan, IL (US); Brad Mullins, Normal, IL (US)

(73) Assignee: Precision Planting LLC, Tremont, IL (US)

( * ) Notice: Subject to any disclaimer, the term of this patent is extended or adjusted under 35 U.S.C. 154(b) by 211 days.

(21) Appl. No.: 14/900,660

(22) PCT Filed: Jun. 24, 2014

(86) PCT No.: PCT/US2014/043963
§ 371 (c)(1),
(2) Date: Dec. 22, 2015

(87) PCT Pub. No.: WO2014/210073
PCT Pub. Date: Dec. 31, 2014

(65) Prior Publication Data
US 2016/0143222 A1    May 26, 2016

Related U.S. Application Data

(60) Provisional application No. 61/838,787, filed on Jun. 24, 2013.

(51) Int. Cl.
*G01B 5/14* (2006.01)
*A01D 41/127* (2006.01)

(52) U.S. Cl.
CPC .......... *A01D 41/1272* (2013.01); *G01B 5/14* (2013.01); *Y10T 29/49895* (2015.01)

(58) Field of Classification Search
CPC .. A01D 41/1272; G01B 5/14; Y10T 29/49895
See application file for complete search history.

(56) References Cited

U.S. PATENT DOCUMENTS 8,450,636 B2    5/2013    Goodman, Jr.

FOREIGN PATENT DOCUMENTS

WO    2013023142 A1    2/2013

OTHER PUBLICATIONS

International Search Report for PCT Application PCT/US2014/043963, dated Nov. 4, 2014, 35 pages.
Yield Sense Installation Guide John Deere 50, 60, 70, and S-Series Combines. Precision Planting. 24 pages.

*Primary Examiner* — Sarang Afzali
*Assistant Examiner* — Ruth G Hidalgo-Hernandez
(74) *Attorney, Agent, or Firm* — Thomas J. Oppold; Larkin, Hoffman, Daly & Lindgren, Ltd.

(57) ABSTRACT

Apparatus, systems and methods are provided for monitoring yield while harvesting grain. In some embodiments a template is provided for cutting an opening in a clean grain elevator plane. In some embodiments, a gauge and shims are provided for positioning a yield sensor on the clean grain elevator.

14 Claims, 10 Drawing Sheets

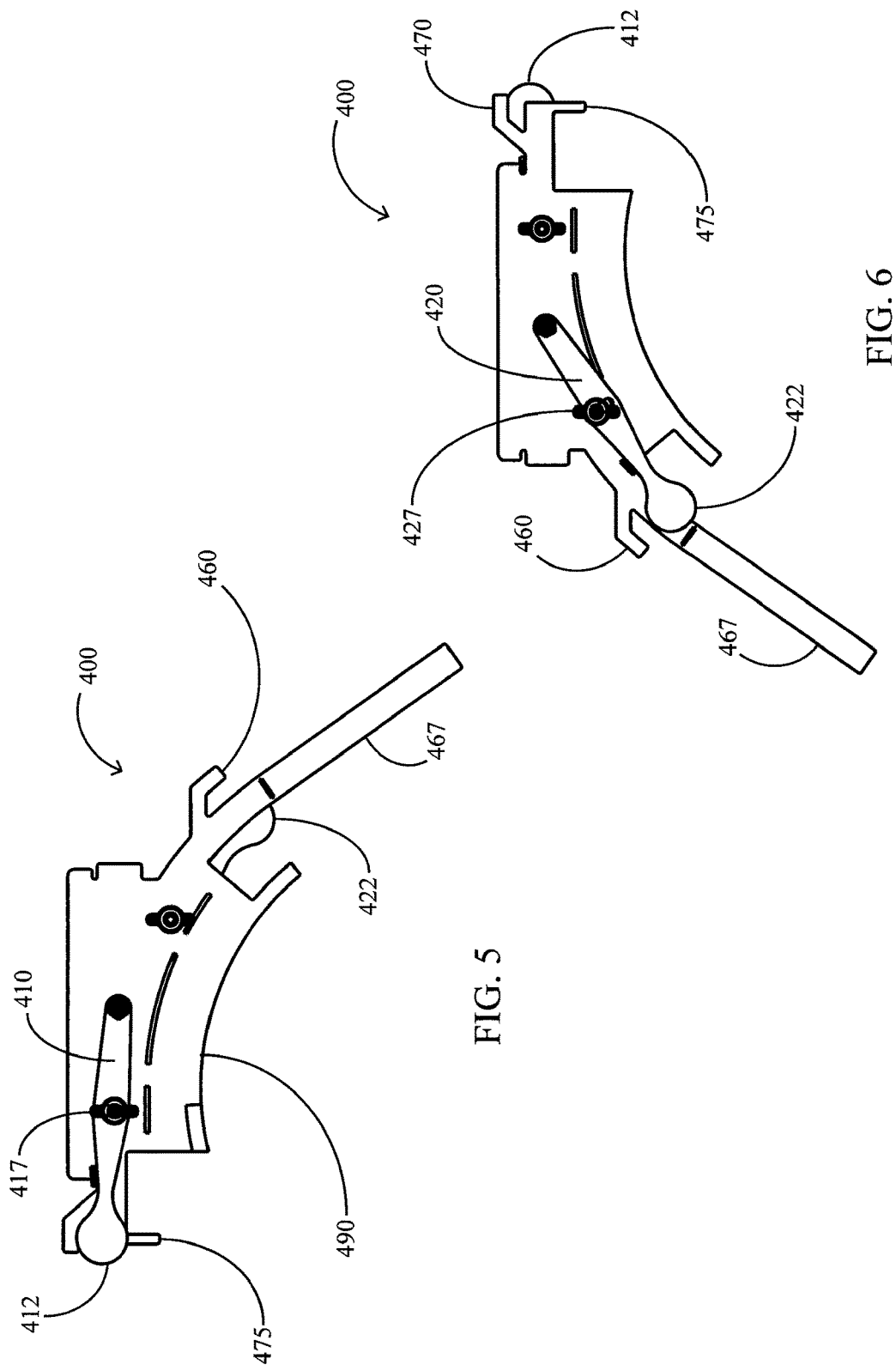

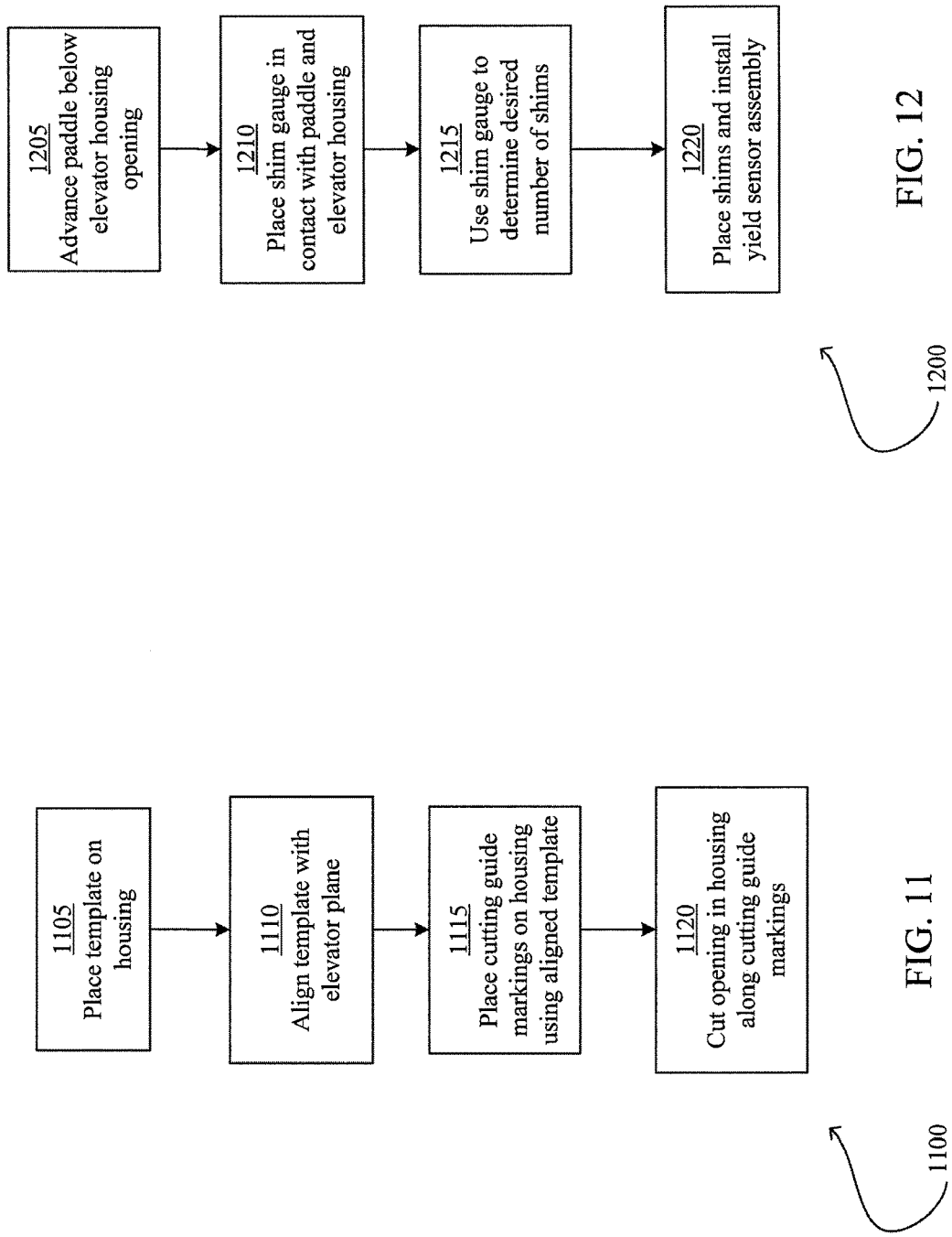

APPARATUS AND METHOD FOR YIELD SENSOR INSTALLATION

BACKGROUND

Live or real-time yield monitoring during crop harvesting is known in the art. One type of commercially available yield monitor uses an impact-type mass flow sensor such as that disclosed in U.S. Pat. No. 5,343,761, which is hereby incorporated herein in its entirety by reference. Although such monitors are generally capable of indicating the relative rate of mass flow in the combine during harvesting, they are known to be substantially inaccurate. As the interest and market investment in site-specific farming practices (e.g., variable rate planting and crop input applications) has increased, the need for accurate yield measurements (e.g., to generate accurate spatial yield maps by associating yield measurements with GPS-tracked locations) has become more significant.

As such, there is a need for apparatus, systems and methods of accurately measuring mass flow rate of grain while harvesting.

BRIEF DESCRIPTION OF THE DRAWINGS

FIG. 5 is a side elevation view of an embodiment of a shim gauge.

FIG. 6 is another side elevation view of the shim gauge of FIG. 5.

FIG. 11 illustrates an embodiment of a process for creating an opening in a clean grain elevator.

FIG. 12 illustrates an embodiment of a process for installing a yield sensor assembly in an opening in a clean grain elevator.

DESCRIPTION

Combine and Yield Sensor

Figure 1:
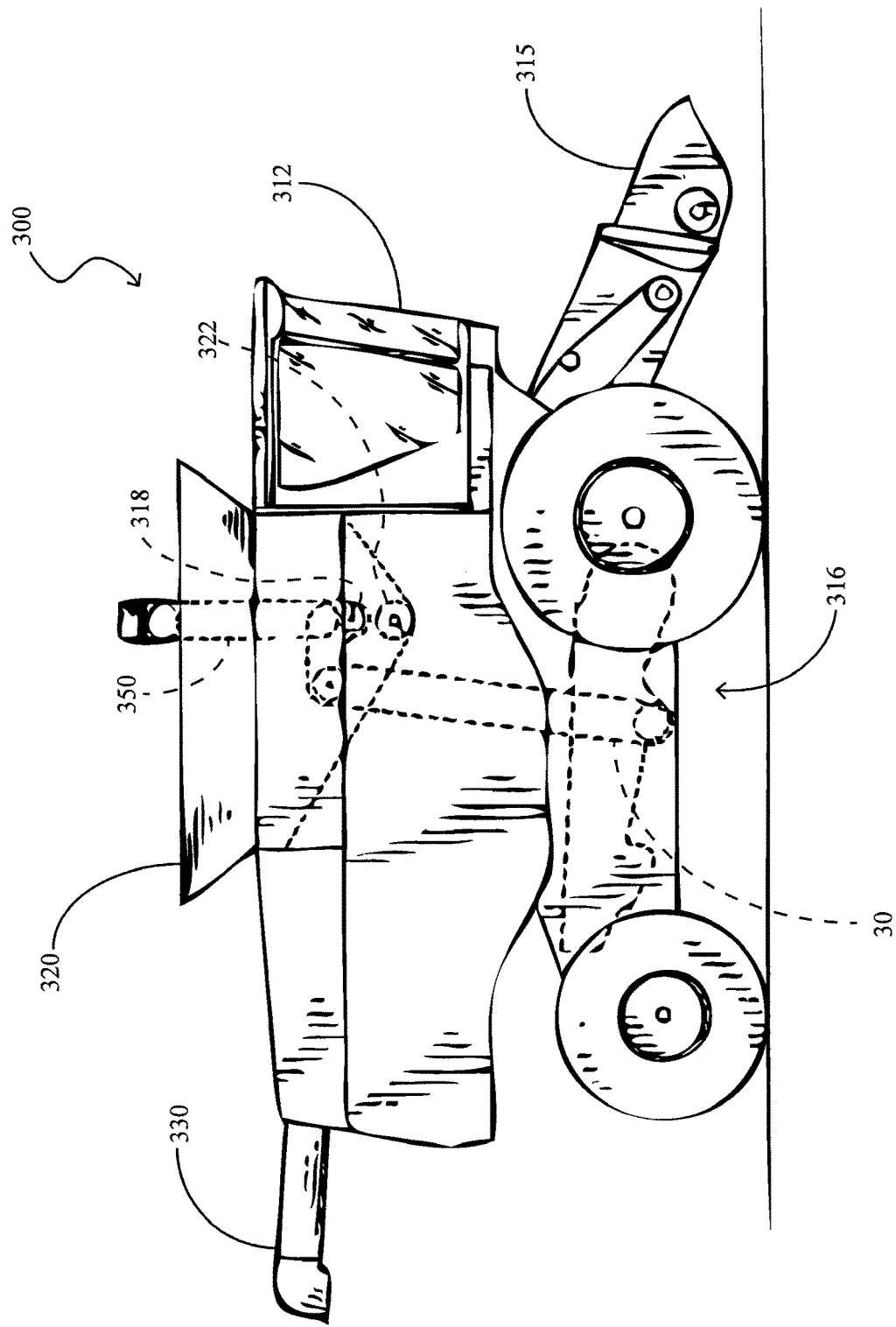
FIG. 1 is a side elevation view of an embodiment of a combine harvester.

Referring now to the drawings, wherein like reference numerals designate identical or corresponding parts throughout the several views, FIG. 1 illustrates a combine 300. As the operator in cab 312 drives the combine 300 through the field, the crop being harvested is drawn through the head 315 into the feeder house 316 where the grain is separated from the other harvested plant material. The separated grain is lifted by a clean grain elevator 40 housed within a clean grain elevator housing 30. The grain is then thrown into a collection area 318. Grain is then lifted from the collection area 318 by a fountain auger 350 and is discharged into a storage container incorporated in the combine such as a grain tank 320. The grain is subsequently conveyed by a cross-auger 322 to an unloading auger 330, which discharges the grain into a grain cart, wagon, truck or other vehicle for transporting for further processing or storage.

Figure 2:
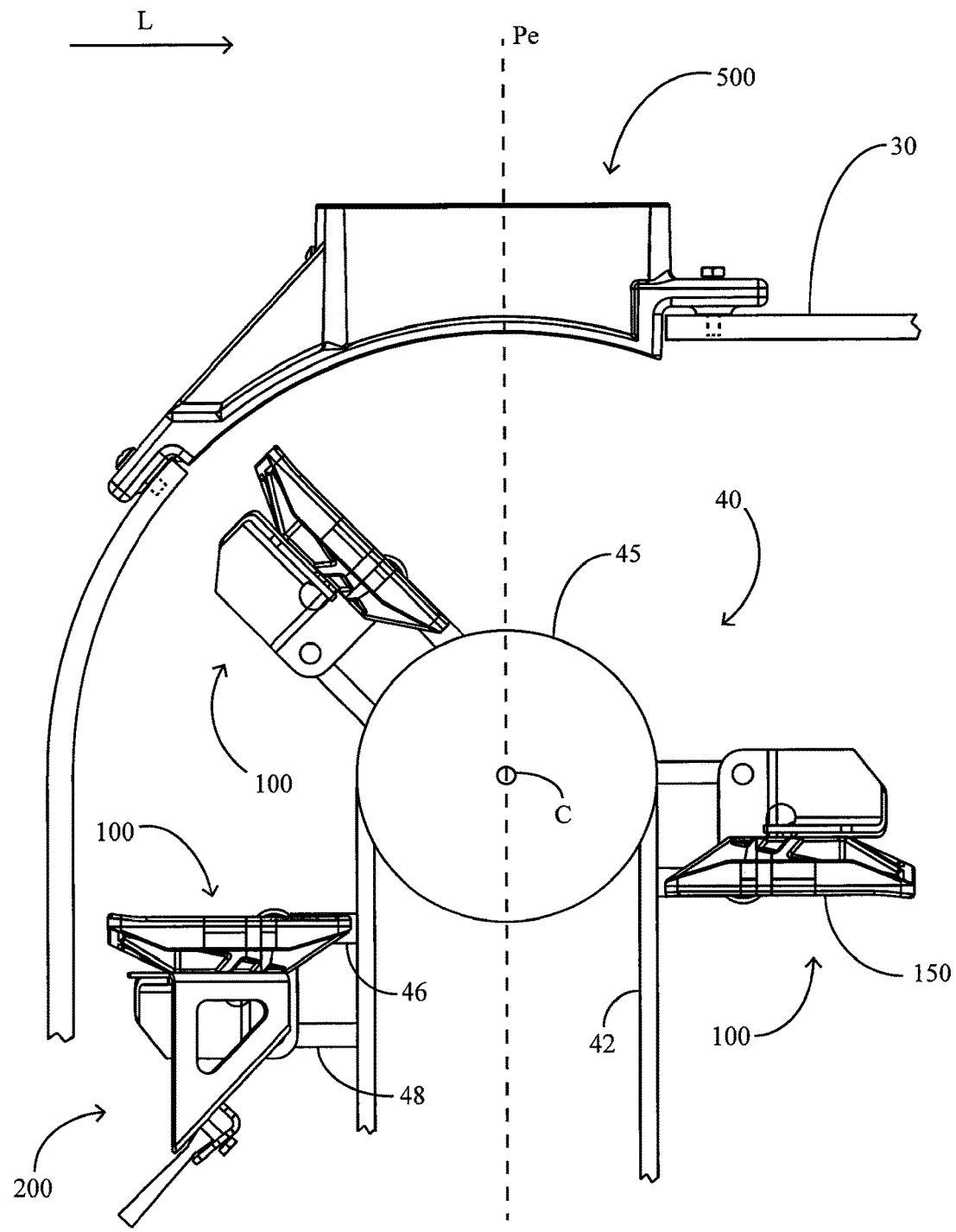
FIG. 2 is a side elevation cutaway view of a clean grain elevator incorporating an embodiment of a yield sensor assembly and an embodiment of a paddle assembly.

FIG. 2 illustrates a grain elevator 40 housed within an elevator housing 30 of the combine 300. The elevator 40 comprises an elevator chain 42 driven about an upper sprocket 45 and a lower sprocket (not shown). A series of grain paddle assemblies 100 mounted to the chain 42 collect grain from a lower portion of the elevator 40. In the illustrated embodiment, the paddle assemblies 100 are mounted to the chain 42 by upper and lower brackets 46, 48. However, as described further below, in a preferred embodiment the brackets 46, 48 are preferably omitted such that the paddle assemblies are mounted directly to the chain. The paddle assemblies 100 each include a paddle 150 (FIG. 3) mounted to the paddle assembly via mounting holes 157 (FIG. 5). The paddles 150 carry the grain up the height of the elevator 40 and throw it toward the collection area 318 for transfer by the fountain auger 350 as discussed above. The center C of the upper sprocket 45 and the center of the lower sprocket (not shown) of the elevator 40 define an elevator plane Pe.

A yield sensor assembly 500 is preferably mounted to an upper portion of the elevator housing 30 as described herein. The yield sensor assembly 500 preferably comprises one of the embodiments disclosed in Applicant's U.S. Provisional Patent Application No. 61/522,153, U.S. Provisional Patent Application No. 61/644,367, U.S. Provisional Patent Application No. 61/754,948 ("the '948 application"), and/or International Patent Application No. PCT/US2012/050341, all of which are hereby incorporated herein in their entirety by reference. The elevator 40 and its paddles may be as described in U.S. Provisional Patent Application No. 61/838,130, incorporated herein by reference. As each paddle 150 travels around the top of the upper sprocket, grain is impelled by centrifugal force from the surface of the paddle and contacts a lower surface of the yield sensor assembly 500. The yield sensor assembly 500 is preferably configured to generate a signal related to the resulting force on the lower portion of the yield sensor assembly.

Figure 10:
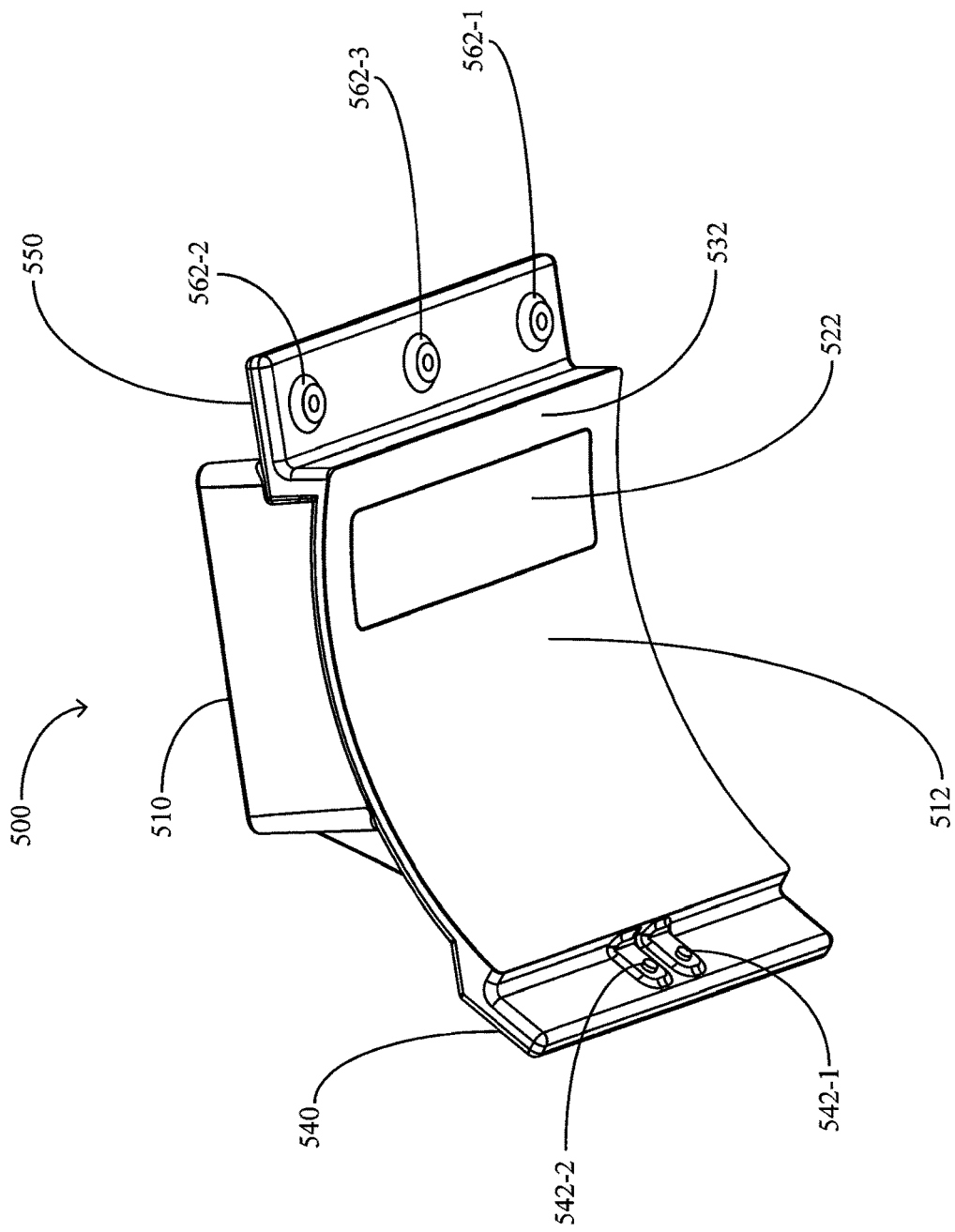
FIG. 10 is a bottom perspective view of the yield sensor assembly of FIG. 2.

The lower surface of the yield sensor assembly 500 is illustrated in FIG. 10. The lower surface of the yield sensor assembly 500 preferably includes a pre-sensor portion 512 and a post-sensor portion 532, both of which comprise surfaces of a housing 510 of the yield sensor assembly 500. The lower surface of the yield sensor assembly 500 further includes a sensor surface 522 mounted for resilient upward displacement; upward displacement of the sensor surface 522 (resulting from forces imposed by grain released from each paddle 150) causes a change in the signal generated by the yield sensor assembly 500.

Yield Sensor Installation

With reference to FIG. 2, the yield sensor assembly 500 is illustrated installed in an opening in the housing 30. It should be appreciated that the accuracy of the yield sensor assembly 500 is related to the precise positioning of the opening. Referring to FIGS. 2 and 10, the position of the hole defines the longitudinal position (i.e., the position along the direction L) of the sensor surface 522 with respect to the elevator plane Pe; the leading edge of the sensor surface 522 is preferably adjacent to the elevator plane Pe and preferably substantially parallel to the elevator plane Pe. Thus a process 1100 for creating a precisely positioned opening in the elevator housing 30 for installing the yield sensor assembly 500 is illustrated in FIG. 11. At step 1105, the user preferably places a template on the top of the elevator housing 30. At step 1110, the user preferably aligns the template with the elevator plane Pe.

Figure 3:
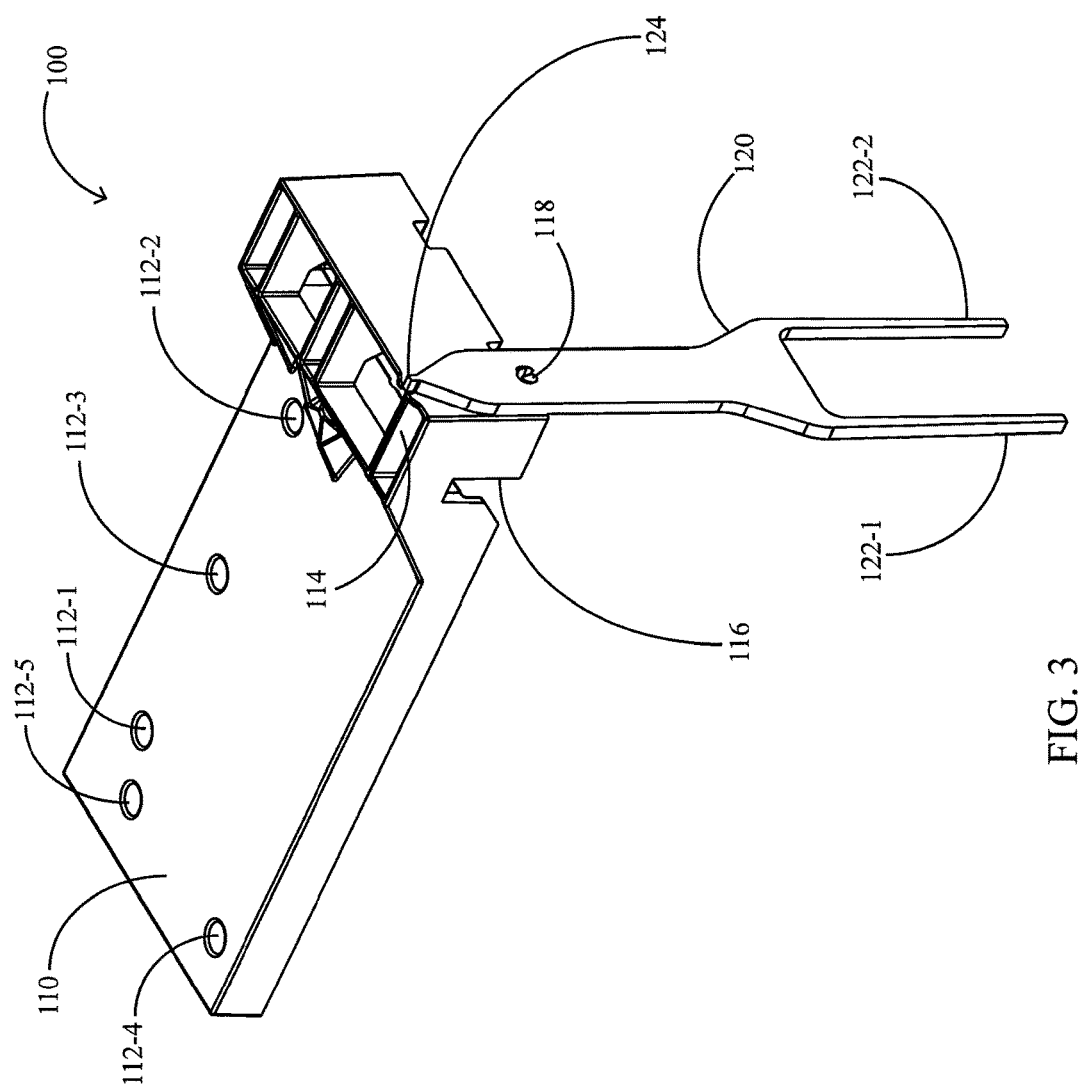
FIG. 3 is a perspective view of an embodiment of a template.
Figure 4:
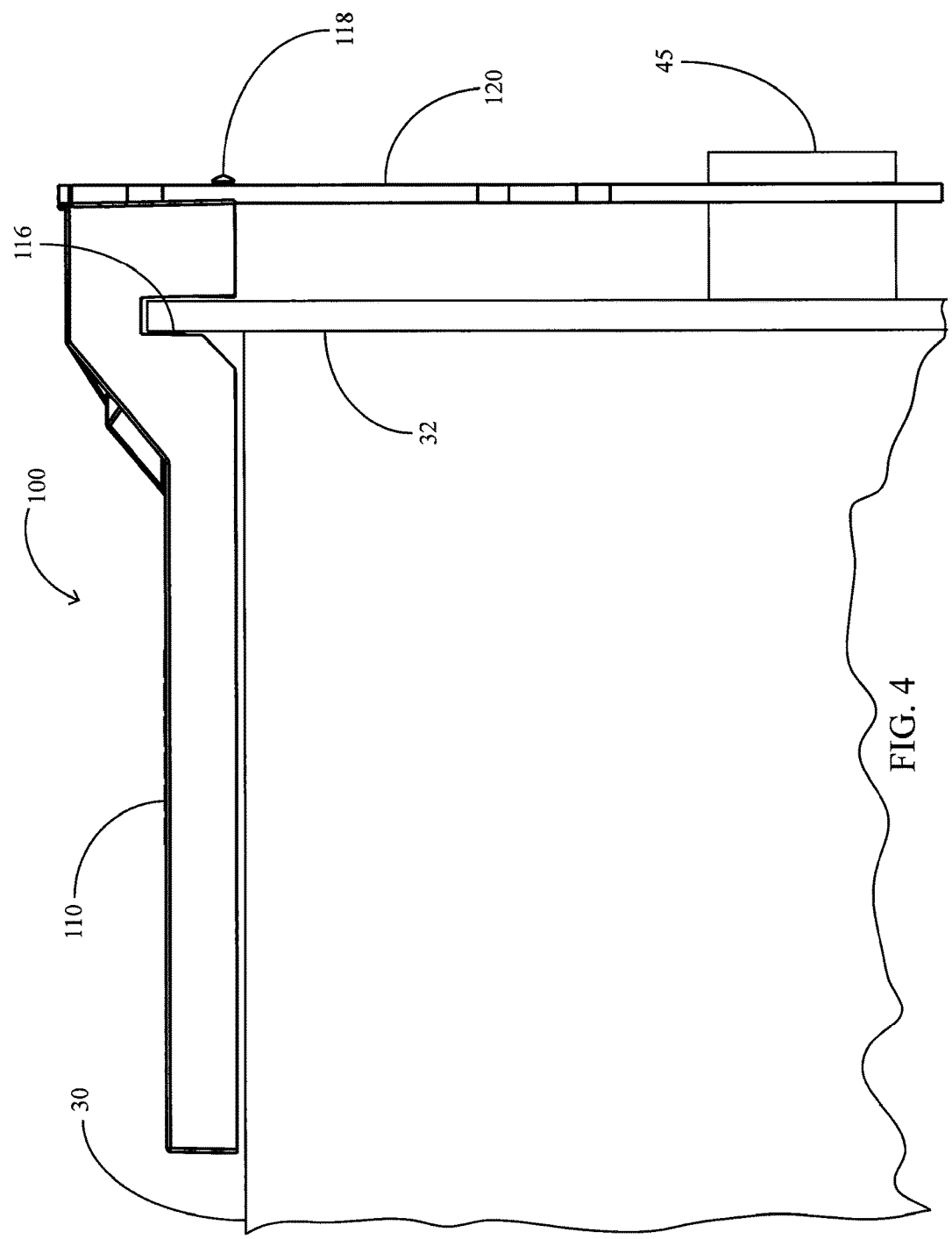
FIG. 4 is a rear view of the template of FIG. 3 engaging the clean grain elevator of FIG. 2.

Turning to FIGS. 3 and 4, an exemplary template 100 is illustrated. The template 100 preferably includes a guide block 110 having a notch 116 configured to engage an upper end of a side plate 32 of the elevator housing 30. An alignment fork 120 is preferably pivotally coupled to the guide block 110 at a pivot 118. The alignment fork 120 preferably includes rearward and forward tines 122-1, 122-2 spaced to engage a portion of the upper sprocket 45 extending from the elevator housing 30. In carrying out step 1110 of the process 1100, the user preferably engages the notch 116 to the side plate 32, engages the alignment fork 120 to the upper sprocket 45, and adjusts the longitudinal position of the guide block 110 until an upper alignment tip 124 of the alignment fork is aligned with a feature (e.g., an alignment rib 114) of the guide block. Once the rib 114 and the tip 124 are aligned, the rib 114 is positioned along the elevator plane Pe. With the guide block 110 in the aligned position, the user preferably secures the guide block in position, e.g., using a set screw (not shown). It should be appreciated that in the illustrated embodiment, the elevator plane Pe is vertical and the pivot 118 is located vertically below the rib 114. In embodiments in which the elevator plane Pe is not vertical, the pivot 118 is preferably located below the rib 114 and longitudinally offset from the pivot.

Returning to FIG. 11, at step 1115 the user preferably places cutting guide markings in the housing using the guide block 110 in the position established at step 1110. Referring to FIG. 3, the user preferably sequentially inserts a punch in alignment holes 112-1 through 112-5 and places an indentation in the housing 30 at each hole 112. The user preferably taps threaded holes through the housing 30 the locations corresponding to alignment holes 112-1, 112-2, 112-3. Returning to FIG. 11, at step 1120, the user preferably cuts an opening in the housing 30 referenced to the cutting guide markings. For example, in some embodiments the user places an adhesive decal (not shown) having holes corresponding to the locations of alignment holes 112 onto the elevator housing 30. The decal preferably includes a cutting pattern used to guide the user in cutting an opening in the elevator housing.

Figure 7:
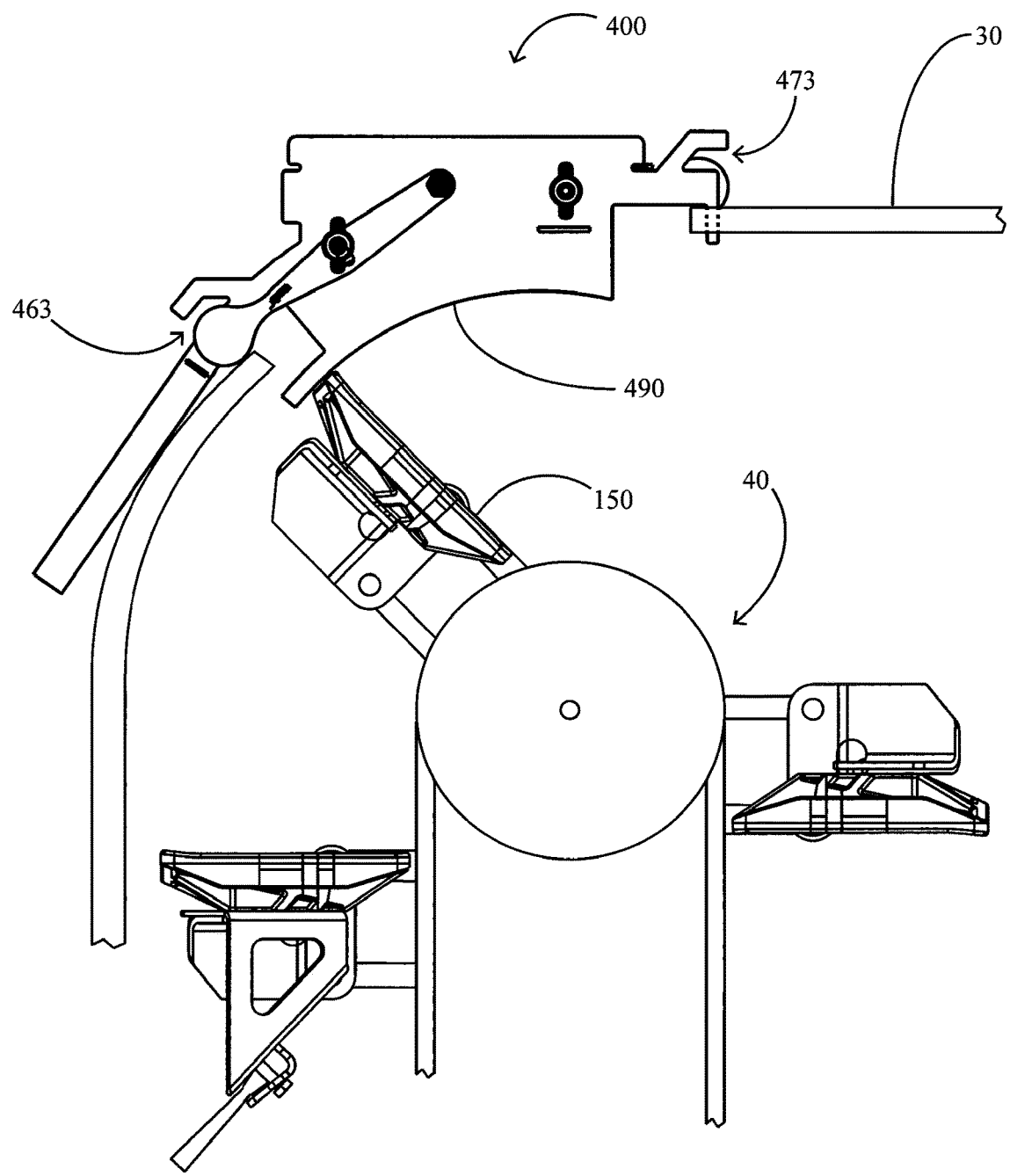
FIG. 7 is a side elevation cutaway view of the shim gauge of FIG. 5 engaging the clean grain elevator of FIG. 2.

Turning to FIG. 12, a process 1200 for installing the yield sensor assembly 500 in the elevator housing is illustrated. At step 1205, the user preferably advances the elevator 40 such that a paddle 150 is positioned beneath the elevator housing opening created in process 1100. At step 1210, the user preferably places a shim gauge in contact with the paddle 150 and the housing 30. Turning to FIGS. 5-7, an exemplary shim guide 400 is illustrated. The shim guide 400 preferably includes a tab 475 sized to be inserted in the hole drilled in the process 1100 and corresponding to the hole 112-3 in the guide block 110. When inserted in the opening in the elevator housing 30, a rear portion 467 preferably contacts a portion of the housing 30 rearward of the opening and a lower arc 490 preferably contacts the paddle 150. The user preferably adjusts the vertical position of the gauge 400 until the paddle 150 remains in contact with the arc 490 as the paddle is advanced around the elevator path. Once the gauge 400 is in the desired position, the user preferably rotates guide arms 410, 420 until their extremities 412, 422, respectively, contact the housing 30. The user then secures the guide arms 410, 420 in place using wing nuts 417, 427, respectively.

Returning to FIG. 12, at step 1215 the user preferably uses the shim gauge 400 to determine a desired number of shims to place forward and rearward of the opening in the housing 30. Referring to FIGS. 5-7, the shim gauge 400 is preferably configured such that the desired number of shims may be fit in gaps 473, 463 between the extremities 412, 422, respectively, and tabs 470, 460, respectively, of the guide arms 410, 420 after step 1210 is carried out as described above.

Figure 8:
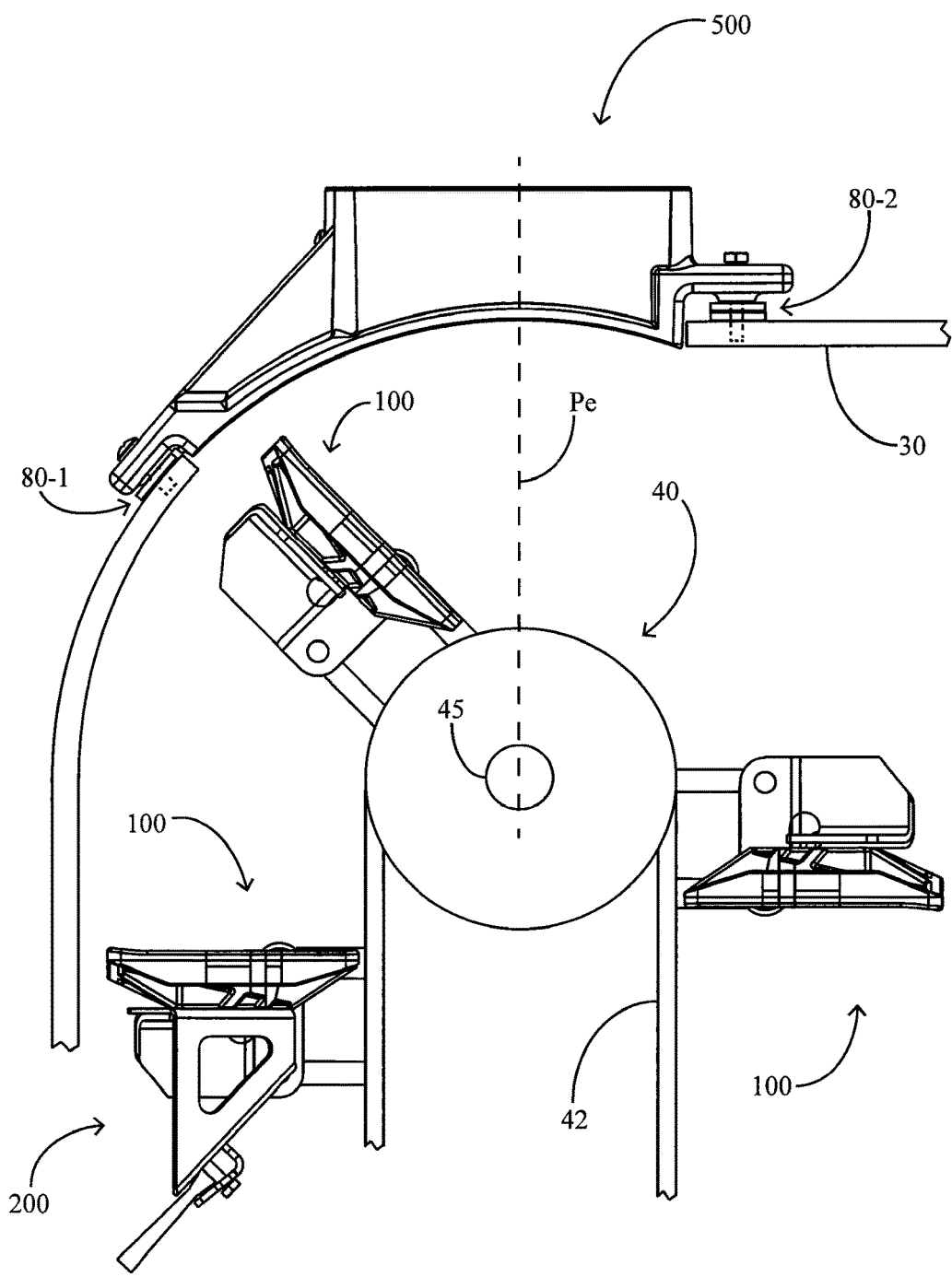
FIG. 8 is a side elevation cutaway view of the clean grain elevator of FIG. 2 with the yield sensor assembly of FIG. 2 installed using shims.

Returning to FIG. 12, at step 1220 the user preferably places the desired number of shims forward and rearward of the housing opening and installs the yield sensor assembly 500d. Referring to FIGS. 8 and 10, the user has placed the desired stack of shims 80 and used holes 562 (corresponding to holes 112 in the template block and the holes drilled in the housing therewith) to secure (e.g., screw) a forward lip 550 of a housing 510 of the yield sensor assembly to the elevator housing 30. Additional holes are preferably tapped in the elevator housing 30 corresponding to holes 542 in a rearward lip 540 of the yield sensor housing 510; the holes 542 are preferably used to secure (e.g., screw) the rearward lip 540 to the elevator housing 530.

Figure 9:
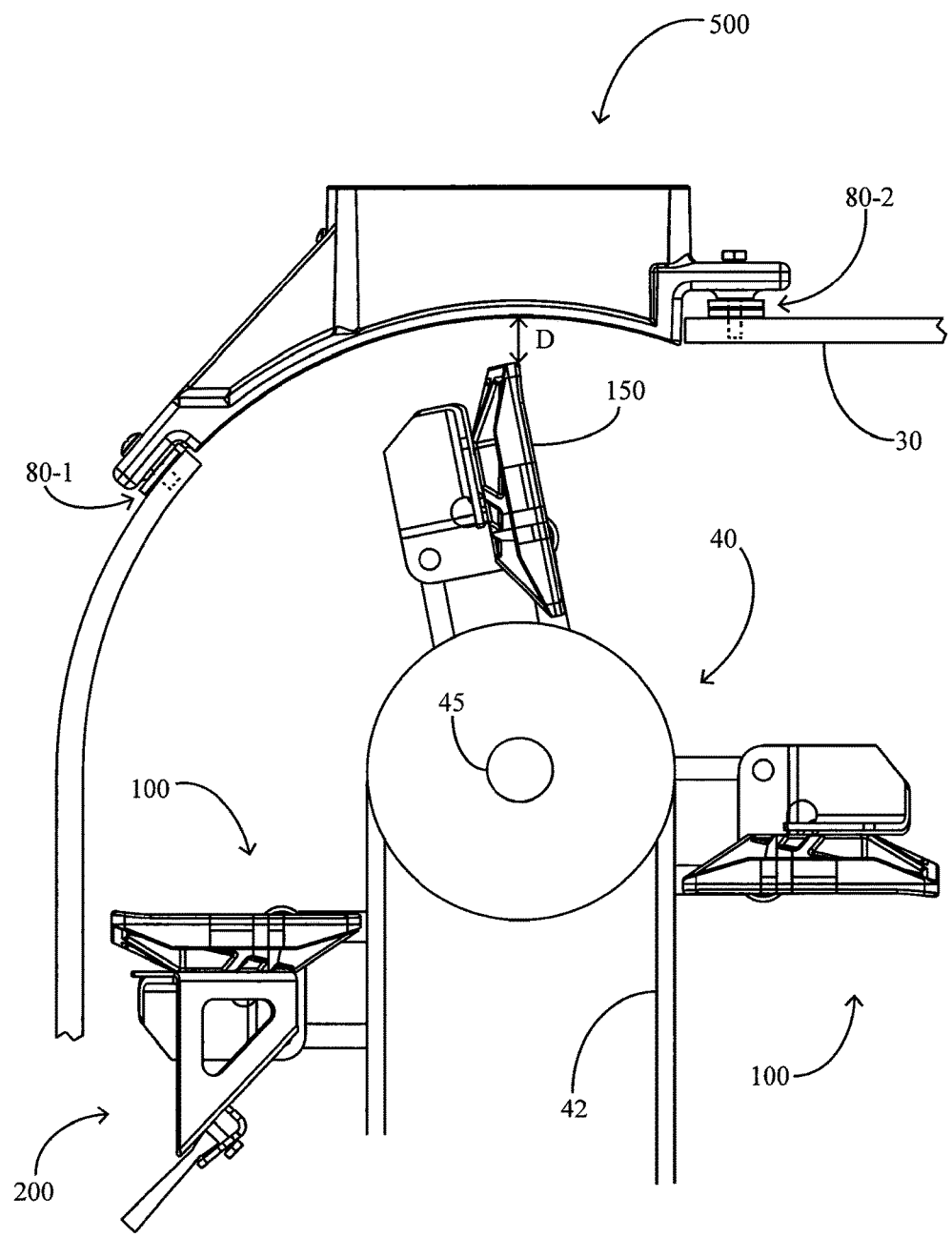
FIG. 9 is a side elevation cutaway view of the clean grain elevator of FIG. 2 with the yield sensor assembly of FIG. 2 installed using shims, with a paddle advanced to an uppermost position to illustrate a paddle clearance.

Referring to FIG. 9, the shim gauge 400 is preferably configured such that when the paddle 150 is at its uppermost position a clearance D between the paddle 150 and the sensor surface 522 is preferably approximately 1 inch, e.g., between 0.925 and 1.0125 inches.

As used herein, the term "user" may refer to any individual installing a yield sensor assembly to the elevator housing or creating corresponding openings in the elevator housing. Thus "user" may refer to, without limitation, an end user, a dealer, an on-site installation technician, or a manufacturing or assembly technician.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A kit for installing a sensor in a combine having a plurality of grain paddles and a clean grain elevator, the clean grain elevator including an upper sprocket and a lower sprocket, and a clean grain elevator housing, the upper and lower sprocket defining an elevator plane, comprising:
 a yield sensor;
 a cutting template configured for indicating alignment with said elevator plane and for guiding a user in cutting an opening in the clean grain elevator housing, said opening sized to receive said yield sensor; and
 a gauge configured to engage said opening and configured to indicate a distance between an upper surface of one of said plurality of grain paddles and a desired position of a lower surface of said yield sensor.

2. The kit of claim 1, wherein said gauge is configured to contact said one of said plurality of grain paddles when said gauge engages said opening.

3. The kit of claim 1, wherein said cutting template is configured to engage the upper sprocket.

4. The kit of claim 1, wherein said cutting template is configured to engage a side plate of said clean grain elevator housing.

5. The kit of claim 1, further including a plurality of shims for placing between said yield sensor and the clean grain elevator housing, whereby said yield sensor is positioned above said clean grain elevator by said distance.

6. The kit of claim 1, wherein said opening intersects said elevator plane.

7. The kit of claim 1, wherein said yield sensor is configured to generate a signal related to a centrifugal force imposed on said yield sensor by a layer of grain released from said one of said plurality of grain paddles.

8. A method of installing a yield sensor in a combine having a plurality of grain paddles and a clean grain elevator, the clean grain elevator including an upper sprocket and a lower sprocket, and a clean grain elevator housing, the upper and lower sprocket defining an elevator plane, comprising:
    aligning a template with the elevator plane;
    cutting an opening in the clean grain elevator housing using said template;
    determining a distance between an upper surface of one of said plurality of grain paddles and a desired position of a lower surface of the yield sensor using a gauge;
    adjusting a vertical position of said yield sensor relative to said upper surface by said distance; and
    installing said yield sensor in said opening.

9. The method of claim 8, wherein said gauge is configured to contact said one of said plurality of grain paddles when said gauge engages said opening.

10. The method of claim 8, wherein said template is configured to engage the upper sprocket.

11. The method of claim 8, wherein said template is configured to engage a side plate of said clean grain elevator housing.

12. The method of claim 8, further including:
    placing a plurality of shims between the yield sensor and the clean grain elevator housing, whereby said yield sensor is positioned above said clean grain elevator by said distance.

13. The method of claim 8, wherein said opening intersects said elevator plane.

14. The method of claim 8, wherein the yield sensor is configured to generate a signal related to a centrifugal force imposed on said yield sensor by a layer of grain released from said one of said plurality of grain paddles.

* * * * *